United States Patent
Zinser

(10) Patent No.: US 8,138,902 B2
(45) Date of Patent: Mar. 20, 2012

(54) SYSTEM ARCHITECTURE FOR MOTOR VEHICLES WITH ENABLE INTERFACES FOR THE START-UP THEREOF

(75) Inventor: Matthias Zinser, Ditzingen (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 469 days.

(21) Appl. No.: 12/473,782

(22) Filed: May 28, 2009

(65) Prior Publication Data

US 2010/0036985 A1 Feb. 11, 2010

(30) Foreign Application Priority Data

Aug. 6, 2008 (DE) .......................... 10 2008 036 678

(51) Int. Cl.
*B60Q 1/00* (2006.01)
*G05B 19/00* (2006.01)
*G06F 19/00* (2011.01)

(52) U.S. Cl. ................... 340/438; 340/439; 340/426.35; 340/514; 340/5.8; 701/29; 701/32; 701/33; 700/26; 710/107; 710/113; 307/9.1

(58) Field of Classification Search ................... 340/438
See application file for complete search history.

(56) References Cited

U.S. PATENT DOCUMENTS 6,351,828 B1 * 2/2002 Frimodig et al. ............... 714/43

FOREIGN PATENT DOCUMENTS

DE 10 2006 019 572 A1 10/2007

* cited by examiner

*Primary Examiner* — Donnie Crosland

(57) ABSTRACT

A system architecture for a motor vehicle has a control unit for identifying an authorized user and a gateway control unit for enabling at least one further data bus, and control units arranged on the at least one further data bus, following the identification of an authorized user. An external diagnostic interface contains a further identification unit and it is enabled and the data in the at least one further data bus system are thus accessible only after an authorized diagnostic tester has been identified.

3 Claims, 1 Drawing Sheet

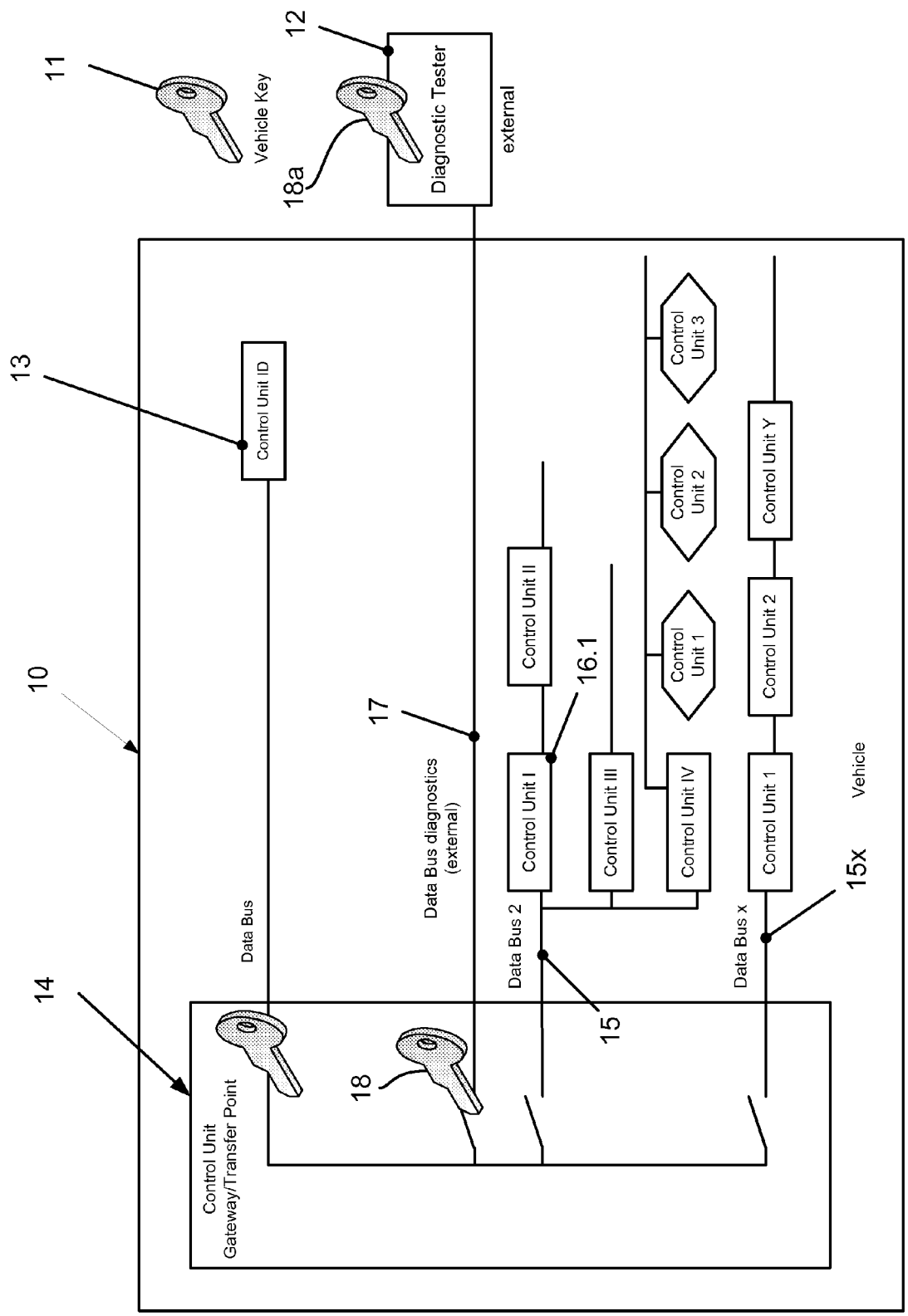

SYSTEM ARCHITECTURE FOR MOTOR VEHICLES WITH ENABLE INTERFACES FOR THE START-UP THEREOF

CROSS-REFERENCE TO RELATED APPLICATION

This application claims the priority, under 35 U.S.C. §119, of German application DE 10 2008 036 678.1, filed Aug. 6, 2008; the prior application is herewith incorporated by reference in its entirety.

BACKGROUND OF THE INVENTION

Field of the Invention

The invention lies in the automotive field. More specifically, the present invention is based on a system architecture for vehicles having an electronic locking and security system. The individual components are connected to one another by way of bus systems for the purpose of interchanging information.

German published patent application DE 10 2006 019 572 describes a system architecture for a group of means of transport in which a radio receiver, an associated radio antenna and a control unit are connected via data lines and the systems are accordingly enabled via an authorization message.

The electronic control units in the motor vehicle are connected to one another by way of bus systems for the purpose of interchanging information, different bus systems being used depending on the volume of data. The point at which the information is transferred between the different bus systems is effected using one or more gateway control units or control units with a gateway function. The individual bus systems and different control units are usually enabled by identifying an authorized user and the system can accordingly be used in its entirety.

Many vehicles also have an interface for a diagnostic tester. The interface allows data to be read from the control units and to be evaluated externally in an appropriate manner in order to thus detect errors at an early stage or analyze the system. These data are usually retrieved using standardized interfaces.

SUMMARY OF THE INVENTION

It is accordingly an object of the invention to provide a system architecture for motor vehicles with enable interfaces which overcomes the above-mentioned disadvantages of the heretofore-known devices and methods of this general type and which provides for standardized security interfaces that are configured such that unauthorized access to data in the control units is not possible and unauthorized manipulation therefore cannot be carried out.

With the foregoing and other objects in view there is provided, in accordance with the invention, a system architecture for a motor vehicle, comprising:

a control unit for identifying an authorized user;

a gateway control unit connected to the control unit and receiving from the control unit information concerning an identification of an authorized user, the gateway control unit, upon identifying an authorized user, enabling at least one further data bus and further control units connected in the at least one further data bus;

an external diagnostic interface and a data bus connecting the external diagnostic interface to the gateway control unit; and at least one further identification unit associated with, or contained in, the external diagnostic interface and configured to enable the external diagnostic interface to gain access to data in the at least one further data bus system only after an authorized diagnostic tester has been identified.

In other words, the objects of the invention are achieved in that the individual control units and the diagnostic tester are not automatically enabled with identification by way of the vehicle key and a user authorized thereby but rather that these systems are gradually enabled by connecting a further enabling operation between the gateway control unit(s) of the system.

This arrangement according to the invention has the advantage that authentication is carried out gradually and subsystems are thus enabled sequentially. This means that the individual bus systems are activated only after positive authentication.

In accordance with a concomitant feature of the invention, the further identification unit is configured to enable the at least one further bus system physically and/or electronically.

Although the invention is illustrated and described herein as embodied in a system architecture for motor vehicles with enable interfaces for the startup thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DESCRIPTION OF THE DRAWING

The FIGURE is a schematic diagram showing a basic overview of the arrangement of the control units in a motor vehicle and their connection to a data bus system.

DETAILED DESCRIPTION OF THE INVENTION

Referring now to the sole FIGURE of the drawing in detail, there is shown a system overview of the topology of the control units in a motor vehicle in its entirety 10. The vehicle is externally assigned a vehicle key 11 and, optionally, a diagnostic tester 12 which can be connected to the vehicle, if required and in a known manner, in order to read data from the control units. The illustration of the vehicle 10 in its entirety shows different control units, one control unit 13 being provided for the purpose of identifying the authorized vehicle key and thus of interrogating the permitted vehicle key. The control unit ID 13, which may also be referred to as the control unit ID or the identification control unit, is connected to a gateway control unit 14 via a first data bus. After the control unit ID 13 has identified the authorized user, it sends a corresponding enable signal to the gateway control unit 14. This gateway control unit 14 now correspondingly enables the further data bus systems with the control units arranged therein via a multiplicity of data lines (data bus 2 to x) that are provided with the reference symbols 15 and 15x in this case. As can be gathered from the FIGURE, the data bus 15 thus branches into different further data lines in which a wide variety of control units for the function of the motor vehicle are arranged.

The function of the individual control units is not relevant to the invention and shall therefore not be explained in any more detail.

The section which is primarily important to the invention is the data bus "diagnostics (external)" that is provided with the reference numeral 17 in the FIGURE. Since this data bus 17 contains a diagnostic interface for an external data read function. The data bus 17 is not immediately enabled for corresponding communication by the gateway control unit 14 in the embodiment according to the invention. Rather, further identification of the authorized tester is integrated at this point. This is indicated in the FIGURE with an electronic key 18. In order to illustrate the function, this electronic key 18 is indicated once again externally on the diagnostic tester with the reference symbol 18*a*. This ensures that authentication is carried out using a corresponding valid electronic key and access to the individual subordinate bus systems is not possible before this enabling operation has been carried out.

The subordinate bus systems can be enabled physically and/or electronically. Without physical enabling, the communication lines between the transfer point of the gateway control unit 14 and the subordinate bus systems 15 to 15*x* are separated. In addition, without electronic enabling, information is not transmitted or is only partially transmitted via the gateway control unit 14. This ensures that the topology of the control units and the bus systems in a motor vehicle cannot be manipulated via an external interface.

The invention claimed is:

1. A system architecture for a motor vehicle, comprising:
   a control unit for identifying an authorized user;
   a gateway control unit connected to said control unit and receiving from said control unit information concerning an identification of an authorized user, said gateway control unit, upon identifying an authorized user, enabling at least one further data bus and further control units connected in said at least one further data bus;
   an external diagnostic interface and a data bus connecting said external diagnostic interface to said gateway control unit; and
   at least one further identification unit associated with said external diagnostic interface and configured to enable said external diagnostic interface to gain access to data in said at least one further data bus system only after an authorized diagnostic tester has been identified.

2. The system architecture according to claim 1, wherein said at least one further identification unit is contained in said external diagnostic interface.

3. The system architecture according to claim 1, wherein said at least one further identification unit is configured to physically and/or electronically enable said at least one further bus system.

* * * * *